US007378983B2

(12) United States Patent
Wang et al.

(10) Patent No.: US 7,378,983 B2
(45) Date of Patent: May 27, 2008

(54) OPTICAL SIGNALING APPARATUS WITH PRECISE BEAM CONTROL

(75) Inventors: Sean Xiaolu Wang, Wilmington, DE (US); Rongsheng Tian, Newark, DE (US); Qingxiong Li, Newark, DE (US); Qun Li, Newark, DE (US)

(73) Assignee: BWT Property Inc., Newark, DE (US)

( * ) Notice: Subject to any disclaimer, the term of this patent is extended or adjusted under 35 U.S.C. 154(b) by 100 days.

(21) Appl. No.: 11/382,078

(22) Filed: May 8, 2006

(65) Prior Publication Data

US 2006/0250269 A1 Nov. 9, 2006

Related U.S. Application Data

(60) Provisional application No. 60/595,664, filed on Jul. 26, 2005, provisional application No. 60/594,807, filed on May 9, 2005.

(51) Int. Cl.

| | |
|---|---|
| ***G08B 5/22*** | (2006.01) |
| ***G09F 9/33*** | (2006.01) |
| *G02B 5/124* | (2006.01) |
| *F21S 8/10* | (2006.01) |
| *F21V 21/00* | (2006.01) |

(52) U.S. Cl. .................. 340/815.45; 362/545; 359/533

(58) Field of Classification Search ........... 340/815.45, 340/815.4, 815.73–815.77, 815.49, 815.5; 362/612, 632, 459, 543–545; 359/475, 529–533
See application file for complete search history.

(56) References Cited

U.S. PATENT DOCUMENTS

| | | | | |
|---|---|---|---|---|
| 3,866,032 | A | 2/1975 | Veres | |
| 4,034,480 | A | 7/1977 | Mehrtens | |
| 4,064,424 | A | 12/1977 | Hergenrother | |
| 4,073,569 | A * | 2/1978 | Rizzo | 359/471 |
| 4,183,078 | A | 1/1980 | Kidd | |
| 4,430,695 | A | 2/1984 | Payne et al. | |
| 4,532,512 | A | 7/1985 | Tanner | |
| 5,139,334 | A | 8/1992 | Clarke et al. | |
| 5,224,773 | A | 7/1993 | Arimura | |
| 5,287,104 | A | 2/1994 | Shemwell | |
| 5,377,683 | A | 1/1995 | Barken | |
| 5,608,290 | A | 3/1997 | Hutchisson | |
| 5,655,308 | A | 8/1997 | McDermott | |
| 5,804,829 | A | 9/1998 | Palmer | |
| 5,967,984 | A | 10/1999 | Chu et al. | |
| 5,982,484 | A | 11/1999 | Clarke et al. | |
| 6,007,219 | A | 12/1999 | O'Meara | |
| 6,030,099 | A | 2/2000 | McDermott | |
| 6,048,083 | A | 4/2000 | McDermott | |
| 6,086,220 | A | 7/2000 | Lash et al. | |
| 6,100,975 | A | 8/2000 | Smith et al. | |
| 6,135,994 | A | 10/2000 | Chernoff | |
| 6,168,294 | B1 | 1/2001 | Erni et al. | |

(Continued)

*Primary Examiner*—George A Bugg
*Assistant Examiner*—Jennifer A Mehmood
(74) *Attorney, Agent, or Firm*—Frank F. Tian

(57) ABSTRACT

A light emitting diode (LED) signaling apparatus for navigational aids is provided. The signaling apparatus comprises a plurality of high intensity LEDs with their output beams individually controlled by high precision optical beam transformers. The transformed LED beams are mixed in a predetermined manner by controlling the relative position, angular orientation, and other parameters of the LEDs to produce a desired illumination pattern.

19 Claims, 7 Drawing Sheets

U.S. PATENT DOCUMENTS 6,224,216 B1 5/2001 Parker et al.
6,265,984 B1 * 7/2001 Molinaroli ............... 340/815.4
6,354,714 B1 3/2002 Rhodes
6,446,467 B1 9/2002 Lieberman et al.
6,464,373 B1 10/2002 Petrick
6,473,002 B1 * 10/2002 Hutchison ................... 340/944
6,489,733 B1 12/2002 Schmidt et al.
6,543,911 B1 4/2003 Rizkin et al.
6,563,854 B2 5/2003 Tedesco et al.
6,688,755 B2 2/2004 O'Meara
6,693,556 B1 * 2/2004 Jones et al. ................. 340/907
6,707,389 B2 * 3/2004 Pederson ............... 340/815.45
6,753,762 B1 6/2004 Jorba Gonzalez
6,859,326 B2 2/2005 Sales
6,902,291 B2 6/2005 Rizkin et al.
6,905,228 B1 6/2005 Takeyasu et al.
6,932,496 B2 8/2005 Rizkin et al.
6,947,571 B1 9/2005 Rhoads et al.
7,021,801 B2 4/2006 Mohacsi
2003/0136837 A1 7/2003 Amon
2003/0187742 A1 10/2003 Yamagishi
2004/0046678 A1 * 3/2004 Grady, Jr. ................... 340/908
2004/0095777 A1 5/2004 Trenchard et al.
2005/0110649 A1 5/2005 Fredericks et al.
2005/0111723 A1 5/2005 Hannigan et al.
2006/0082760 A1 4/2006 Lin
2006/0250801 A1 11/2006 Trenchard et al.

* cited by examiner

OPTICAL SIGNALING APPARATUS WITH PRECISE BEAM CONTROL

REFERENCE TO RELATED APPLICATIONS

This application claims an invention which was disclosed in Provisional Applications No. 60/594,807, filed May 9, 2005, entitled "High Brightness LED Lighting Apparatus with Beam Shaping and Homogenizing Element for Navigational Aids" and No. 60/595,664, filed Jul. 26, 2005, entitled "Self-Contained LED Lighting Apparatus for Maritime Navigational Aid". The benefit under 35 USC§119(e) of the above mentioned two U.S. Provisional Applications is hereby claimed, and the aforementioned applications are hereby incorporated herein by reference.

FIELD OF THE INVENTION

This invention generally relates to optical signaling apparatus, and more specifically to a navigational LED signaling apparatus with precise beam control.

DESCRIPTION OF RELATED ART

Optical signaling systems are important navigational aids for aircrafts, boats, or other vehicles. Conventional optical signaling system generally utilizes incandescent or arc lamps as light sources, which suffer from low efficiency and short lifespan. Several approaches have been disclosed in prior arts to replace conventional lamps with light emitting diode (LED) based light sources. The LED light source has the advantages of greatly increased lifetime (more than 10,000 hours versus 1,000 hours for an incandescent lamp), less power consumption, and compact size.

U.S. Pat. No. 6,086,220 issued to Lash et al. (hereinafter referred to as "Lash") discloses a marine safety light for a boat to maximize the same's visibility to other boaters during darkness and inclement weather conditions. The light consists of a LED array which consists of a plurality of LEDs arranged in a star configuration. The LED array preferably consists of six white LEDs evenly spaced in the horizontal plane and positioned within a Fresnel lens such that an even omni-directional distribution of light is emitted. However, in the exemplified embodiment, Lash produces visible light merely over one nautical mile away from the vessel.

To enhance the brightness of the light, one approach is to increase the number of LED chips used. However, special lenses have to be employed to collect the light from the LED array. For example, U.S. Pat. No. 5,224,773 issued to Arimura discloses a beacon lantern with thin film acrylic resin based cylindrical Fresnel lens, which is formed by heating and molding method. U.S. Pat. No. 6,048,083 to McDermott describes an optical lens contoured to have multiple focal points for efficient LED light collection and projection.

Another approach to enhance the brightness of the light is to utilize high intensity (high flux) LED chips as described in U.S. Pat. No. 7,021,801 to Mohacsi and in U.S. patent application No. 2004/0095777 to Trenchard et al.

In the Mohacsi patent, a high-intensity side-emitting LED is used in combination with a multi-faceted reflector to produce a wedge-shaped directional beam of light for boat navigation. The drawback of this approach is that the optical signaling apparatus is hardly upgradeable to incorporate multiple LED chips to further enhance its brightness as the side-emitting LED produces a wide 360° light beam. In the Trenchard patent application, twelve or more high flux LED chips are employed in combination with an annularly grooved Fresnel lens and an optical diffuser to achieve uniform illumination. The optical diffuser has at least one randomly roughened surface, which is used to homogenize the LED beam. The complex design of the Fresnel lens and the high insertion loss of the randomly roughened diffuser are the drawbacks of the Trenchard approach.

Even with the recent development of known LED technology, the brightness of a single LED chip still cannot match that of conventional incandescent or arc lamps. Thus an array of LEDs will generally be needed to produce a light intensity that meets the national or international standards, such as FAA, NOAA, ICAO, UK-CAA, and/or NATO standards for navigational signaling lights. In another aspect, most standards require that the navigational light beam satisfies certain criteria in divergence angle, intensity distribution, elevation angle, etc. The above results in a significant challenge in regard to LED beam manipulation because the LED array cannot be viewed as a point light source. Therefore, it is desirous to have a navigational LED signaling apparatus having a plurality of LEDs each generating part of a beam with precise beam control.

SUMMARY OF THE INVENTION

The present invention provides a high intensity LED signaling apparatus with precisely controlled light beam for navigational aids.

According to one aspect of the invention, there is provided a navigational signaling apparatus comprising at least one, preferably an array of high intensity LEDs. The light beam produced by each LED is controlled individually by a secondary optical system, which precisely defines its intensity distribution, divergence angle, and other parameters. The secondary optical system preferably comprises a non-imaging optical component for light collection, an optical lens for beam collimation, and an optical diffuser for beam homogenization and transformation. The optical diffuser is preferably a holographic diffuser featuring a high transmittance and a capability to anisotropically alter the divergence angle of the LED beam.

According to another aspect of the invention, the relative position or the spatial distribution and the angular orientation of the LED units in the LED array is precisely controlled so that the transformed LED beams mix in a predetermined manner to produce an illumination pattern with desired intensity distribution, divergence angle, and/or other parameters. The precisely controlled LED array may be achieved by means of computer aided design in order to arrive at the desired result. In other words, the LED units are positioned based upon a set of calculations such as computer simulations. The positions include the spatial distribution and angular orientation of the LED units.

Such a discrete LED beam control method eliminates the need for complex lens design, which will be required if the light produced by all the LED units in the LED array is controlled holistically in a known manner as described in the prior arts. The present invention also provides the flexibility to produce relatively complex illumination patterns.

According to yet another aspect of the invention, there is provided a plurality of sensor elements and a control unit in the optical signaling apparatus to monitor and control the system's performance. The sensor elements may include photo detectors to monitor the intensity of LED light and stray light, thermistors to monitor environment and LED temperature, and color sensors to monitor the output wavelength of the LED light. The control unit may further comprise a wireless transceiver for remote control.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
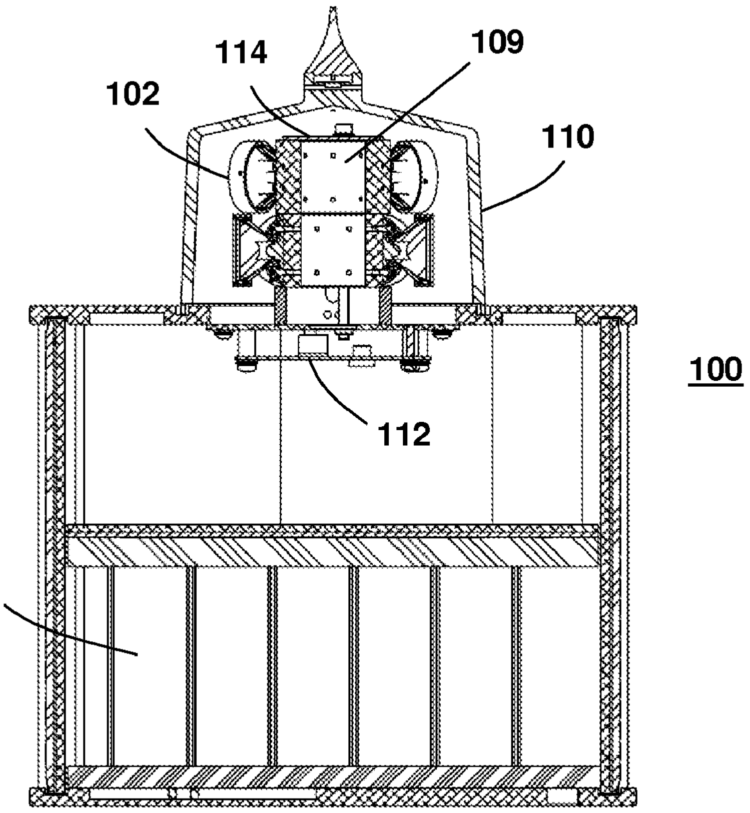
FIG. 1*a* shows a vertical cross-section view of an exemplified omnidirectional buoy lantern constructed with high intensity LEDs and optical beam control components.
FIG. 1*b* shows a perspective view of the buoy lantern of FIG. 1*a;*
FIG. 1*c* drafts a transverse cross-section view of the LED units used in the buoy lantern of FIGS. 1*a-b;*
Figure 1:
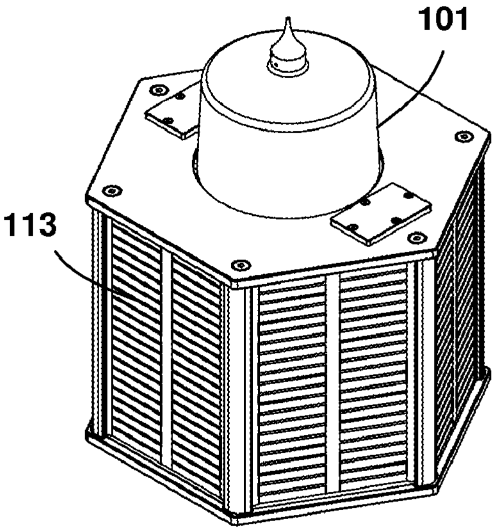
Figure 1:
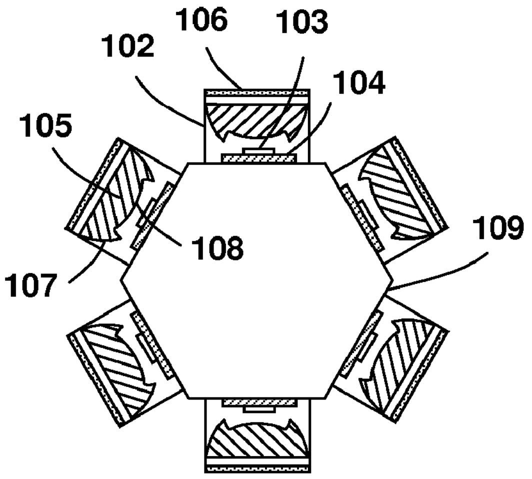

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a high intensity LED signaling apparatus with precisely controlled light beam for navigational aids. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a high intensity LED signaling apparatus with precisely controlled light beam for navigational aids described herein. The non-processor circuits may include, but are not limited to, a radio receiver, a radio transmitter, signal drivers, clock circuits, power source circuits, and user input devices. As such, these functions may be interpreted as steps of a method to perform functions relating to a high intensity LED signaling apparatus with precisely controlled light beam for navigational aids. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIGS. 1-7, in one embodiment of the current invention as shown in FIG. 1*a* and FIG. 1*b*, the optical signaling apparatus 100 is an omnidirectional buoy lantern for maritime navigational aids. The optical head 101 of the optical signaling apparatus 100 comprises twelve high intensity LED units 102 mounted in two stacks with a first stack positioned on top of the second stack. Each stack comprises six LED units separated by sixty degrees (60°) angularly in the horizontal plane. An angular offset of thirty degrees (30°) may be introduced between the two LED stacks for more uniform illumination. A set of solar panels 113 may be positioned on the side of apparatus 100 for converting solar energy to electric energy and providing electric power for illumination and other purposes.

A schematic illustration of the LED unit is shown in FIG. 1*c*. The LED unit 102 comprises a surface mounted, or in other words, chip-on-board (COB) packaged high power LED chip 103 mounted on a heat sink 104. A non-imaging lens 105 is provided on the light path of LED chip 103 to collect and collimate the light beam emitted by the LED chip 103 to a divergence angle ($2\theta_{1/2}$) of eight by eight degrees (8°×8°) in the horizontal plane and the vertical plane, respectively. A thin film holographic diffuser 106 is positioned on an opposite side of the non-imaging lens 105 to homogenize and expand the light beam anisotropically to sixty by eight degrees (60°×8°) in the horizontal plane and the vertical plane, respectively. All the LED units 102 are formed or mounted circumferentially on the outer side of a hexagonal shaped aluminum cylinder 109 for heat dissipation.

The non-imaging lens 105 is composed of a diffractive optical element 107 and a reflective optical element 108 with optimized profiles for efficient light collection. The light collection efficiency of the non-imaging lens 105 can reach a level of greater than eighty five percent (>85%). The holographic diffuser 106 may be the one described by Lieberman et al. in U.S. Pat. No. 6,446,467 (hereinafter merely Lieberman), which is hereby incorporated herein by reference. The holographic diffuser 106 features laser speckle induced microstructures on its surfaces. Different from an optical diffuser with randomly roughened surfaces, the size and shape of the diffusion microstructures on the holographic diffuser can be controlled by the manufacturing process such that the diffraction angle of the output beam is well defined. On one hand, this feature brings in an ultra high transmittance of >85%. On the other hand, it allows the divergence angle of the light beam to be precisely controlled in a manner that $\theta_o^2=\theta_i^2+\theta_d^2$, where $\theta_o$ is the divergence angle of the output beam, $\theta_i$ is the divergence angle of the input beam, and $\theta_d$ is determined by the view angle of the diffuser. In this exemplary embodiment, $\theta_i$ is about 8°×8°, $\theta_d$ is about 60°×1°, and $\theta_o$ is about 60°×8° in the horizontal plane and vertical plane, respectively. Thus the six LED units in one LED stack will produce a full 360° even illumination in the horizontal plane. The high output intensity of the COB LED chip 103, in combination with the high light collection efficiency of the non-imaging lens 105 and the high transmittance of the holographic diffuser 106, result in a luminous intensity of greater than 60 candelas (>60 candelas) for the optical signaling apparatus 100. Therefore optical signaling apparatus 100 is adapted to be visible from a distance of several nautical miles. The luminous intensity can be further enhanced by simply incorporating more LED units or employing LEDs with higher output powers.

Figure 2:
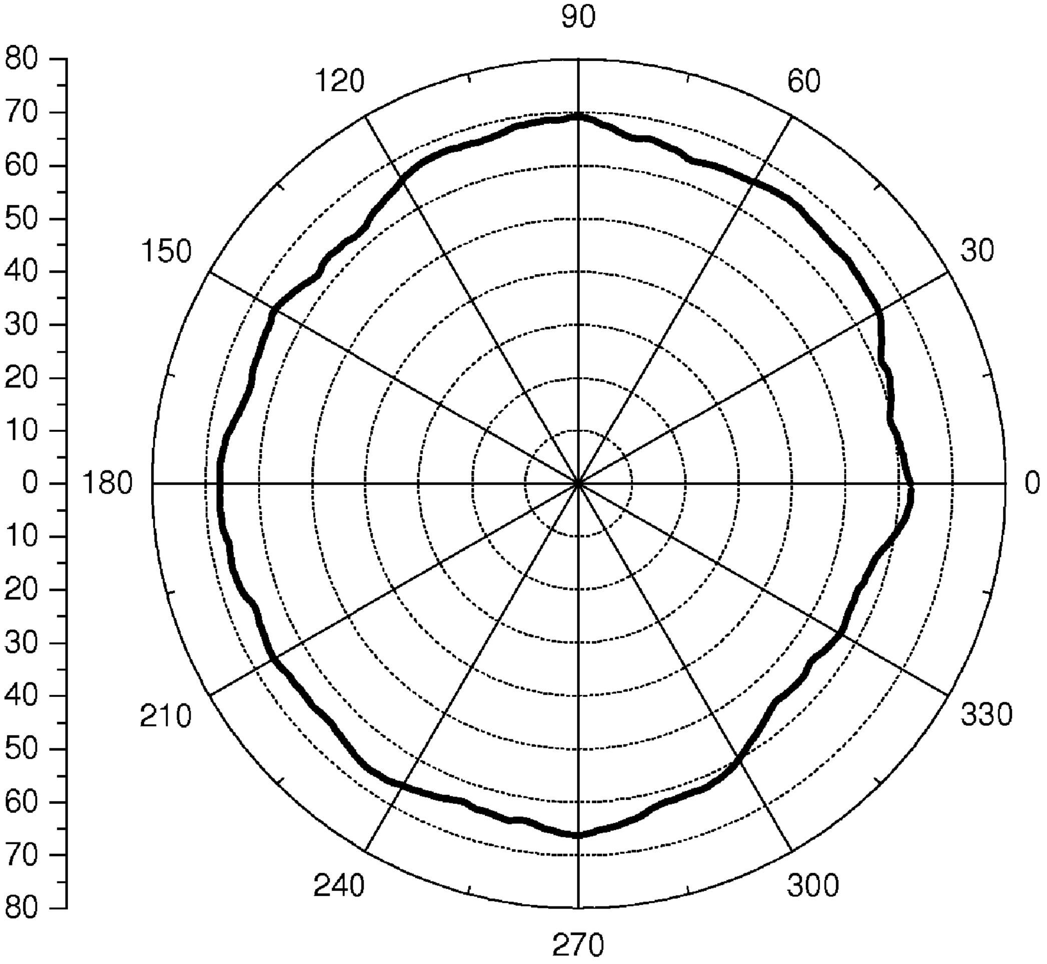
FIG. 2 shows the measured luminous intensity of the buoy lantern of FIGS. 1*a-c* in different angular directions of the horizontal plane.

In this embodiment, the intensity distribution and divergence angle of the transformed LED beams, together with the spatial distribution and angular orientation of the LED units, are accurately designed with an optical ray tracing software such that uniform illumination is achieved in different angular directions of the horizontal plane. The measured luminous intensity of the optical signaling apparatus 100 is shown in FIG. 2. An angular uniformity of <±10% is achieved as a result of the discrete LED beam control method described above. The two-stack structure employed in this exemplary optical signaling apparatus helps to solve the 'point-of-failure' problem, i.e., when certain LED fails, the optical signaling apparatus can roughly maintain its luminous intensity and beam uniformity by increasing the drive current of the other LEDs, especially the adjacent LEDs.

Figure 3:
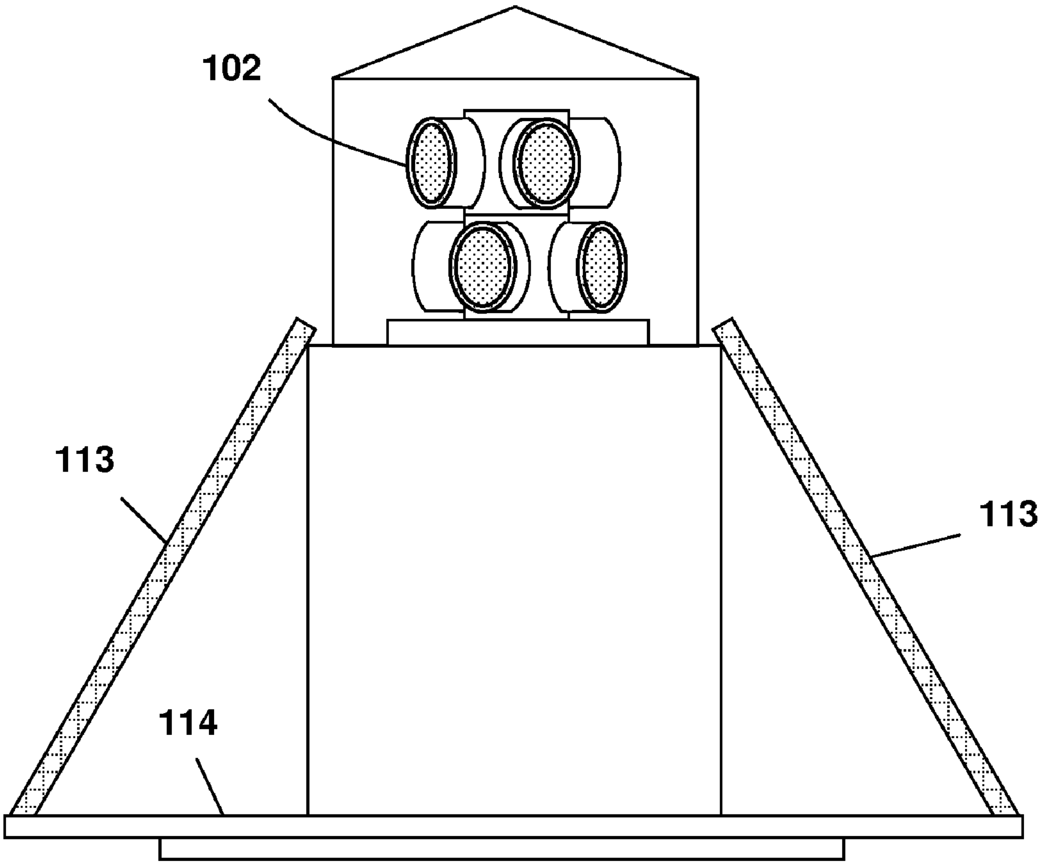
FIG. 3 shows an alternative embodiment of the buoy lantern of FIGS. 1*a-c;*
Figure 4:
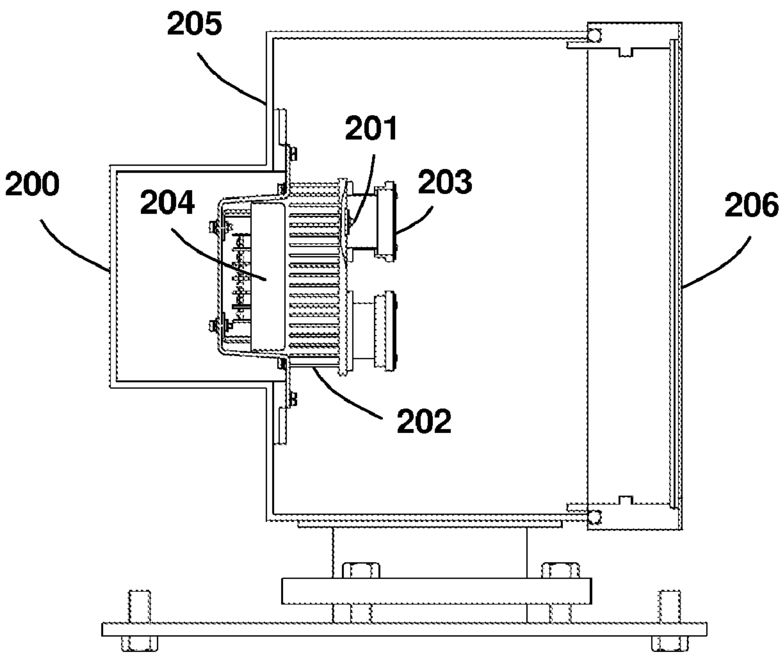
FIG. 4*a* shows a vertical cross-section view of an exemplified range lantern built with high intensity LEDs and standard Fresnel lenses.
FIG. 4*b* shows a transverse cross-section view of the range lantern of FIG. 3*a;*
Figure 4:
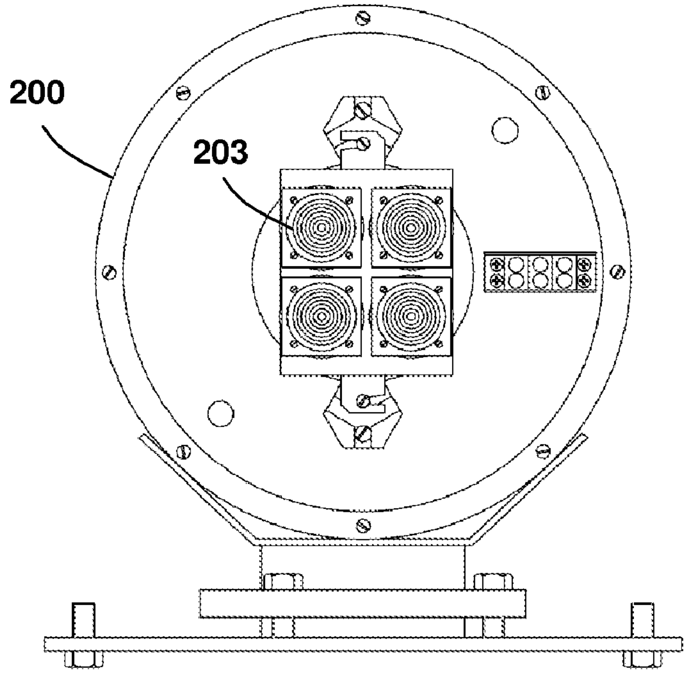
Figure 5:
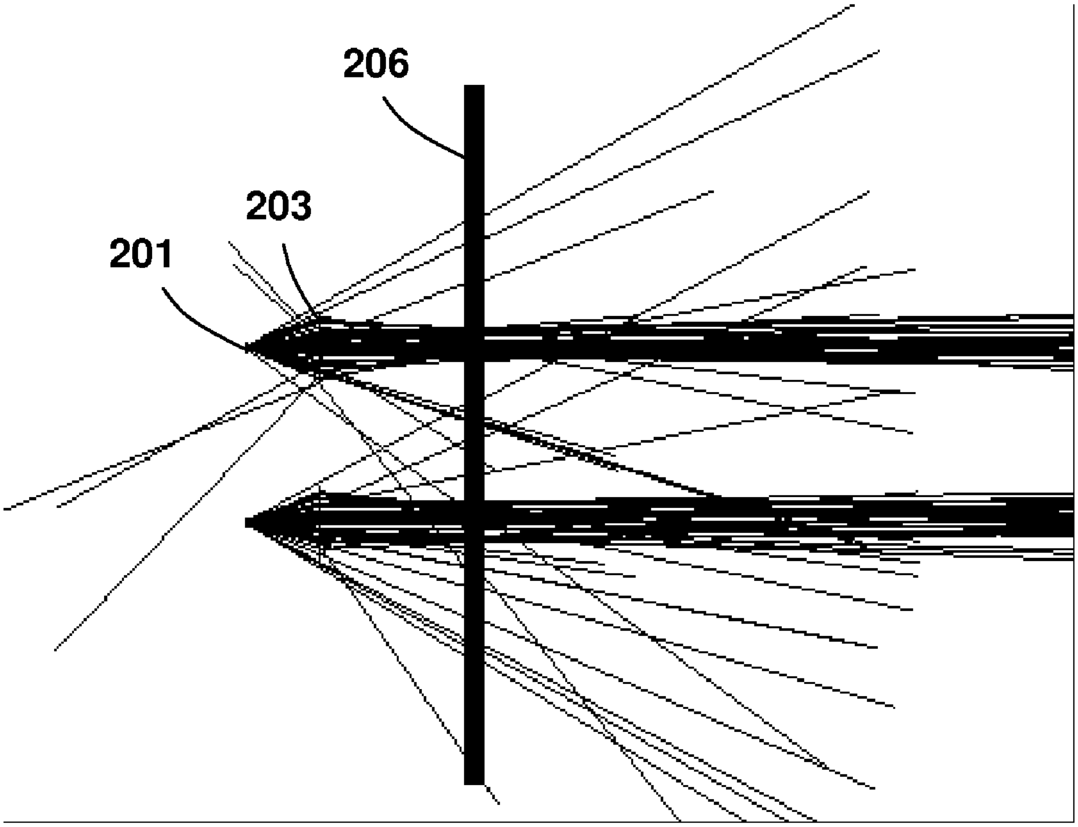
FIG. 5*a* shows an optical ray tracing model of the LED beams produced by the range lantern of FIGS. 4*a-b* in a short distance from the LEDs.
FIG. 5*b* shows an optical ray tracing model of the LED beams produced by the range lantern of FIGS. 4*a-b* in a long distance from the LEDs.
Figure 5:
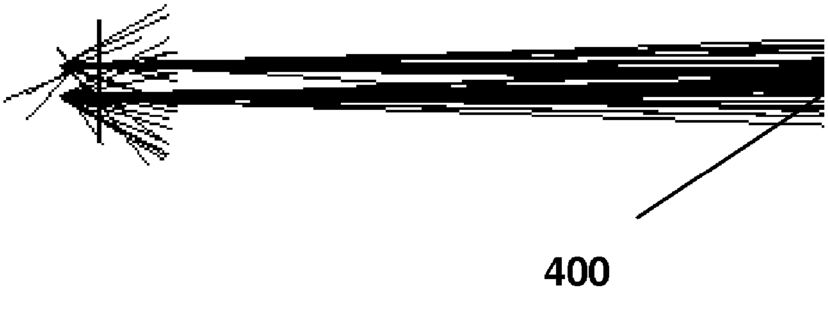

The LED units 102 of the optical signaling apparatus 100 are enclosed in a waterproof transparent housing 110 and powered by a group of rechargeable batteries 111 through a control circuit board 112. The rechargeable batteries 110 are further powered by a group of solar panels 113, enabling the optical signaling apparatus 100 to operate without other external power supplies. The rechargeable batteries 111 are capable of operating over a wide temperature range, such as from minus 40 degrees Celsius to positive 70 degrees Celsius (−40° C. to 70° C.), and are designed as field exchangeable components. In other words, batteries 111 may comprise of exchangeable units. Attached to the top of the aluminum cylinder 109 is a small circuit board 114 comprising one or more photo detectors to monitor the level of stray light from ambient environment. The photo detectors may provide information to a switch for automatically shutting down the optical signaling apparatus 100 during day time. Referring to FIG. 3, in a slight variation of the current embodiment, the solar panels 113 may adopt an expandable design to fully utilize the solar energy in that when panels 113 are positioned at different angles in relation to the sun, more solar energy can be converted. In their non-operation status, the solar panels 113 are folded into a vertical position to render a compact size for easy transportation and installation. In their operation status, the solar panels 113 are expanded through a movable frame 114. The tilt angle of the solar panel 113 may be adjusted according to the geographical position, such as latitude of the optical signaling apparatus to collect the maximum amount of solar energy. The optical signaling apparatus may further comprise other kinds of sensor elements such as photo detectors to monitor LED intensity, thermistors to monitor environment and LED temperature, color sensors to monitor the output wavelength of the LED units, as well as a wireless transceiver for remote monitoring and control.

In another preferred embodiment of the current invention as shown in FIG. 4*a* and FIG. 4*b*, the optical signaling apparatus 200 is a range lantern used to mark entrance channels for boats or other vehicles. The optical signaling apparatus 200 comprises four COB packaged LED units 201, each providing a white light emission with high luminous flux of up to 65 lumens. The intensity distribution of the produced LED beam follows a Lambertian profile. The LED units 201 are seated on an aluminum heat sink 202 for heat dissipation and preventing the LED chips from thermal degradation. Four standard Fresnel lenses 203 with low f-number (f/#) are used to efficiently collect the light emission from individual LED units 201 and collimate the LED beams to a divergence angle of three by three degrees (3°×3°) in the horizontal plane and vertical plane, respectively. The LED units 201 are driven by a control circuit board 204, which determines their on/off status and output intensity. The LED units 201, the Fresnel lens 203, and the control circuit board 204 are enclosed in a waterproof housing 205 with a transparent window 206 facing the output end of the LED units 201. In this embodiment, uniform illumination is achieved by optimizing the focal length of the Fresnel lenses 203 and the spatial distribution of the LED units 201 so that the light beams are evenly mixed at a selected or predetermined distance away from the LED sources. An optical ray tracing model of the LED beam propagation scheme in short and long distance from the LED units 201 are illustrated in FIG. 4*a* and FIG. 4*b*, respectively, showing how the LED beams are mixed at a target plane 400 to produce uniform illumination. In this embodiment, the measured luminous intensity of the range lantern is greater than 14,000 candelas (>14,000 candelas). The luminous intensity can be further improved by incorporating more LED units into the optical signaling apparatus.

Figure 6:
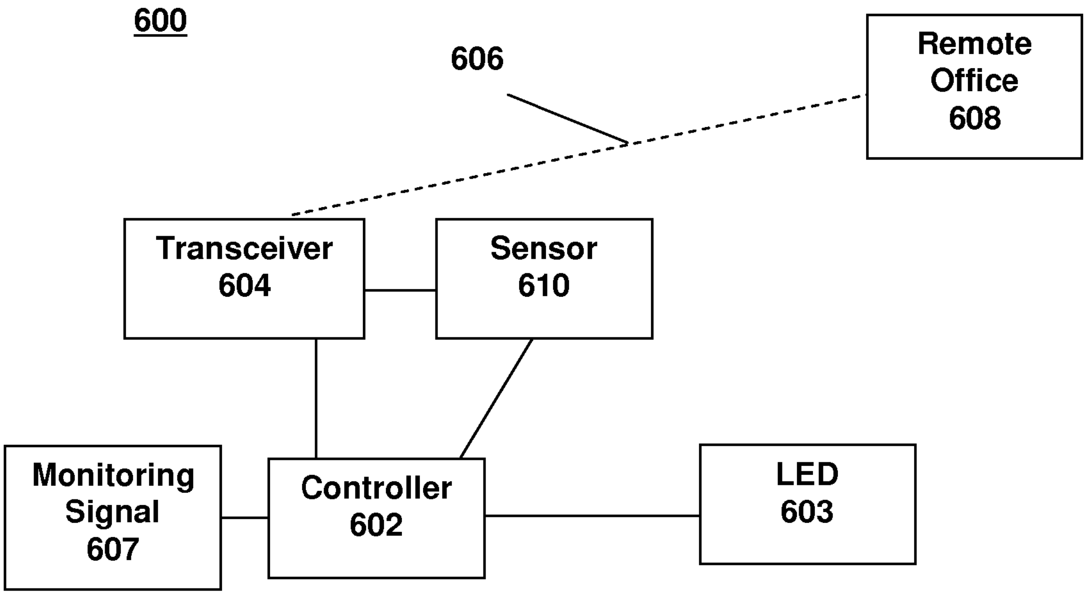
FIG. 6 shows a block diagram of the monitoring and control scheme for the optical signaling apparatus disclosed in the present invention.

Referring specifically to FIG. 6, a block diagram 600 of the monitoring and control scheme for the present invention is shown. A microcontroller 602 and a wireless transceiver 604 are used to regulate the drive current of the LEDs 603. One purpose of this current regulation is to adjust the luminous intensity of the LEDs 603 according to environment variations, such as weather change, to maintain visibility of the optical signaling apparatus. Another purpose is to vary the light intensity to generate a certain flash pattern for special signaling. Yet another purpose is to control or switch the wavelength or color of a multi-colored LED module 603 for signaling system reconfiguration. Here the microcontroller 602 combines all the control functions such as on/off switch, current regulator, color controller and flash generator. The wireless transceiver 604 allows the optical signaling apparatus to be controlled through wireless communication 606 with a remotely located control office 608. Such control includes simple turning the system on/off, adjusting the light intensity, varying the flash pattern, and/or activating some particular LED elements (such as green and red in the visible range or infrared in the invisible range) for wavelength or color reconfiguration. The wireless communication 606 may adopt a secured spread-spectrum frequency-hopping coding format such that existing signaling system is not interfered.

With the embedded microcontroller 602, the optical signaling apparatus also possesses the intelligence to control/reconfigure itself according to a monitoring signal 607. For example, the microcontroller 602 can shut down the optical signaling apparatus and/or notify the control office if its output level falls below a set specification, such as 25% of its normal luminous intensity. The monitoring signal may come from the embedded sensors 610 within the optical signaling apparatus. Such sensors 610 may include photo detectors to monitor (i) the luminous intensity of the LEDs 603; (ii) the stray light (not shown) from the environment (which can be used to determine visibility of the optical signaling apparatus); (iii) the luminous intensity of the sun light (which can be used to estimate the available solar photovoltaic energy from the solar panel). The sensors 610 may also include color sensors to monitor the output wavelength of the LEDs, thermistors to monitor the junction temperature of the LEDs and the temperature of the environment, and weather condition related sensors, such as ceilometers, anemometers, dynamometers, barometers, rain & snow gauges, lightening detection antennas, psychometric slide rules and evaporation gauges. The obtained sensor information can be transmitted to the control or remote office 608 for further analysis and decision making through the wireless transceiver 604.

Figure 7:
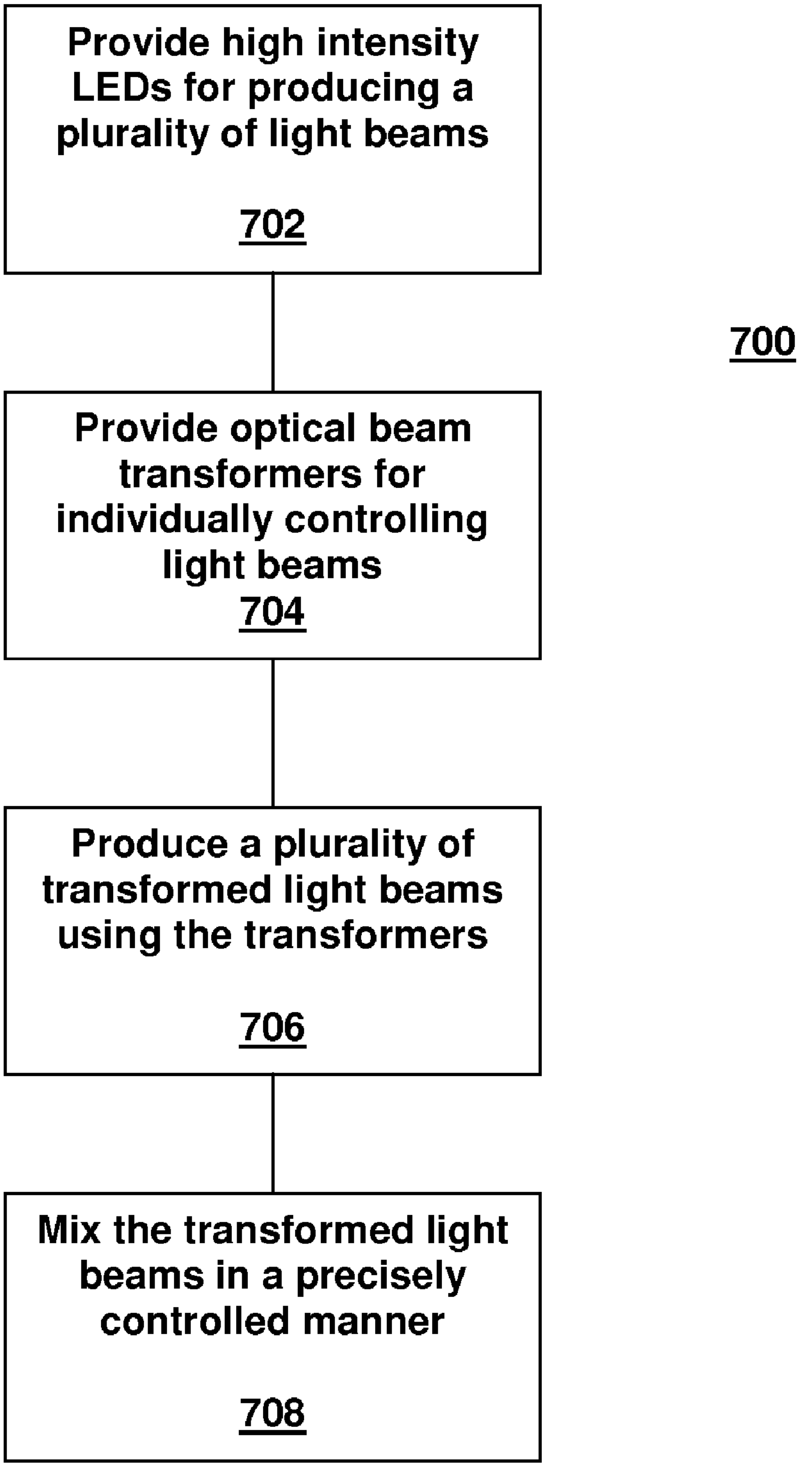
FIG. 7 shows a flowchart of the method disclosed in the present invention.

Referring to FIG. 7, a flowchart 700 for forming a light beam with a required intensity distribution for navigational aids is shown. A plurality of high intensity LEDs is provided for producing a plurality of light beams (Step 702). The plurality of light beams forms a light path that is respectively intercepted and subjected to a plurality of optical beam transformers for individual property control (Step 704). The optical beam transformer may include at least one non-imaging optical component and may include at least one optical lens. Further, the optical beam transformer may also be an optical diffuser, which is capable of homogenizing and anisotropically altering the divergence angle of the light beam to produce a plurality of transformed light beams as a result of the previous step (Step 706). In a precisely controlled manner, the transformed light beams are mixed to produce a resultant light beam with a required intensity distribution (Step 708). The mixing may be achieved by controlling the relative position or the spatial distribution and angular orientation of the LEDs. Further, a plurality of sensor elements may be provided to monitor and control the performance of the LEDs. Still further, a wireless transceiver may be provided for sending and receiving remote monitoring and/or control signals.

A method for forming a light beam with a required intensity distribution is provided for navigational aids. The method includes: providing a plurality of high intensity LEDs for producing a plurality of light beams; providing a plurality of optical beam transformers for individually controlling the properties of the plurality of light beams and producing a plurality of transformed light beams; and mixing the transformed light beams in a precisely controlled manner to produce a resultant light beam with a required intensity distribution for navigational aids.

An optical signaling apparatus for navigation aids is provided. The optical signaling apparatus includes a plurality of high intensity light emitting diodes (LEDs) for producing a plurality of light beams. A plurality of optical beam transformers is positioned in a path of the light beams such that a set of properties of the light beams is individually controlled and thereafter transformed to a plurality of transformed light beams. Both the plurality of high intensity light emitting diodes and the optical beam transformers are pre-adjusted or pre-disposed within the optical signaling apparatus for mixing the transformed light beams to produce a desired illumination pattern for navigational aids.

In the foregoing specification, specific embodiments of the present invention have been described. However, one of ordinary skill in the art appreciates that various modifications and changes can be made without departing from the scope of the present invention as set forth in the claims below. For example, the illumination pattern produced by the optical signaling apparatus is not limited to a uniform pattern. Other complex patterns can be easily realized by controlling the intensity and divergence angle of individual LED units. The optical diffuser can be made of micro-lens arrays as disclosed by Sales in U.S. Pat. No. 6,859,326 which is hereby incorporated herein by reference. Furthermore, numerical values and recitations of particular substances are illustrative rather than limiting. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A light emitting diode (LED) signaling apparatus comprising:

a plurality of high intensity light emitting diodes (LEDs) for producing a plurality of light beams; and a plurality of optical beam transformers, positioned in a path of the light beams, for individually controlling a set of properties of the light beams and producing a plurality of transformed light beams;

wherein each optical beam transformer among the plurality of optical beam transformers is associated with a respective LED among the plurality of high intensity LEDs to individually control the set of properties of one associated light beam;

wherein both the plurality of high intensity light emitting diodes and the optical beam transformers are pre-adjusted or pre-disposed within the signaling apparatus for mixing the transformed light beams to produce a desired illumination pattern.

2. The signaling apparatus of claim 1, wherein the optical beam transformer comprises at least one non-imaging optical lens.

3. The signaling apparatus of claim 1, wherein the optical beam transformer comprises at least one optical diffuser.

4. The signaling apparatus of claim 3, wherein the optical diffuser anisotropically alters the divergence angle of the light beam.

5. The signaling apparatus of claim 3, wherein the optical diffuser is a holographic diffuser.

6. The signaling apparatus of claim 3, wherein the optical diffuser comprises micro-lens arrays.

7. The signaling apparatus of claim 1 further comprising a plurality of sensor elements to monitor and control the performance of the LEDs.

8. The signaling apparatus of claim 7, wherein the sensor elements comprises a photo detector.

9. The signaling apparatus of claim 1 further comprising a wireless transceiver for sending and receiving remote monitoring and control signals.

10. A method for forming a light beam with a required intensity distribution, the method comprising the steps of:

providing a plurality of high intensity LEDs for producing a plurality of light beams;

providing a plurality of optical beam transformers for individually controlling the properties of the plurality of light beams and producing a plurality of transformed light beams; and mixing the transformed light beams in a precisely controlled manner by adjusting the position or the spatial distribution and angular orientation of the plurality of high intensity LEDs and the plurality of optical beam transformers to produce a resultant light beam with a desired intensity distribution;

wherein each optical beam transformer among the plurality of optical beam transformers is associated with a respective LED among the plurality of high intensity LEDs to individually control the set of properties of one associated light beam.

11. The method of claim 10, wherein the optical beam transformer comprises at least one non-imaging optical lens.

12. The method of claim 10, wherein the optical beam transformer comprises at least one optical diffuser.

13. The method of claim 12, wherein the optical diffuser anisotropically alters the divergence angle of the light beam.

14. The method of claim 12, wherein the optical diffuser is a holographic diffuser.

15. The method of claim 12, wherein the optical diffuser comprises micro-lens arrays.

16. The method of claim 10 further comprising a step of providing a plurality of sensor elements for monitoring and controlling the performance of the LEDs.

17. The method of claim 16, wherein the plurality of sensor elements comprises a photo detector.

18. The method of claim 10 further comprising a step of providing a wireless transceiver for sending and receiving remote monitoring and control signals.

19. The signaling apparatus of claim 1, wherein the signaling apparatus is formed within a navigational aid.

* * * * *